United States Patent
Underwood et al.

(10) Patent No.: US 7,047,679 B2
(45) Date of Patent: May 23, 2006

(54) MOLDED SIGN FACING PLATE

(75) Inventors: J. Larry Underwood, Woodstock, GA (US); Ricky W. Tumlin, Acworth, GA (US)

(73) Assignee: L. L. Culmat, L.P., Woodstock, GA (US)

( * ) Notice: Subject to any disclaimer, the term of this patent is extended or adjusted under 35 U.S.C. 154(b) by 207 days.

(21) Appl. No.: 10/281,943

(22) Filed: Oct. 28, 2002

(65) Prior Publication Data

US 2004/0081721 A1 Apr. 29, 2004

(51) Int. Cl.
G09F 13/04 (2006.01)

(52) U.S. Cl. .......................................... 40/570; 40/580
(58) Field of Classification Search ................ 40/564, 40/570, 580, 581, 579; 362/812
See application file for complete search history.

(56) References Cited

U.S. PATENT DOCUMENTS

| | | | | |
|---|---|---|---|---|
| 2,079,468 A | * | 5/1937 | Schirmer | 40/579 |
| 2,193,058 A | * | 3/1940 | Carver | 40/579 |
| 3,309,806 A | | 3/1967 | Gallagher | |
| 3,402,494 A | | 9/1968 | Gray | |
| 3,425,146 A | * | 2/1969 | Winstanley | 40/581 |
| 4,420,898 A | | 12/1983 | Moses | |
| 4,466,208 A | | 8/1984 | Logan, Jr. et al. | |
| 4,918,578 A | | 4/1990 | Thompson | |
| 4,967,317 A | * | 10/1990 | Plumly | 40/570 |
| 5,047,907 A | | 9/1991 | Hawkins | |
| 5,105,568 A | | 4/1992 | Branning | |
| 5,365,411 A | | 11/1994 | Rycroft et al. | |
| 5,388,357 A | | 2/1995 | Malita | |
| 5,398,170 A | * | 3/1995 | Lee | 40/581 |
| 5,410,453 A | | 4/1995 | Ruskouski | |
| 5,416,679 A | | 5/1995 | Ruskouski et al. | |
| 5,428,912 A | | 7/1995 | Grondal et al. | |
| 5,448,843 A | | 9/1995 | Schwartz | |
| 5,459,955 A | | 10/1995 | Ruskouski et al. | |
| 5,539,623 A | | 7/1996 | Gurz et al. | |
| 5,641,221 A | * | 6/1997 | Schindele et al. | 40/580 |
| 5,687,500 A | * | 11/1997 | Lamparter | 40/572 |
| 5,735,498 A | * | 4/1998 | Jue et al. | 248/222.12 |
| 5,771,617 A | | 6/1998 | Baker | |
| 5,899,009 A | | 5/1999 | Fisher | |
| 5,913,617 A | * | 6/1999 | Helstern | 40/564 |
| 5,946,837 A | | 9/1999 | Ackers | |
| 5,950,340 A | | 9/1999 | Woo | |
| 5,964,051 A | | 10/1999 | Loeber et al. | |
| 5,988,825 A | | 11/1999 | Masters et al. | |
| 6,026,602 A | | 2/2000 | Grondal et al. | |
| 6,105,291 A | | 8/2000 | Gabrius et al. | |
| 6,106,126 A | | 8/2000 | Neustadt | |
| 6,142,648 A | | 11/2000 | Logan et al. | |

(Continued)

*Primary Examiner*—Gary C. Hoge
(74) *Attorney, Agent, or Firm*—Brinks Hofer Gilson Lione

(57) ABSTRACT

A mold for stepwise molding, using two different plastics, signage composed of a plurality of symbols surrounded by a continuous matrix including a first mold member having a first cavity defining surface including at least one first gate for admitting a first plastic, and a second mold member movable with respect to the first mold member having a second cavity defining surface confronting the first cavity defining surface. The cavity defining surfaces are spaced from each other by a predetermined distance to define a first cavity receiving the first plastic. The second mold includes lateral surfaces defining at least some of the plurality of symbols. At least one second gate is provided in the first mold member, each second gate admitting a second plastic only when a second cavity is defined so that at least a portion of the lateral surfaces defining at least some of said plurality of symbols are retained in position as the second plastic is injected.

4 Claims, 7 Drawing Sheets

| | | | |
|---|---|---|---|
| 6,152,581 A | 11/2000 | Masters et al. | |
| 6,240,665 B1 | 6/2001 | Brown et al. | |
| 6,241,369 B1 | 6/2001 | Mackiewicz | |
| 6,294,983 B1 | 9/2001 | Lee | |
| 6,399,866 B1 | 6/2002 | Tanaka | |
| 2003/0226299 A1 * | 12/2003 | Chou | 40/591 |

\* cited by examiner

MOLDED SIGN FACING PLATE

BACKGROUND OF THE INVENTION

The present invention relates generally to the manufacture of signs such as exit signs illuminated by selected light sources and having a standard housing frame forming a basic housing unit. The present invention particularly relates to molds for stepwise molding, using two different plastics, signage composed of a plurality of symbols surrounded by a continuous matrix adapted for coupling to the basic housing unit.

Emergency lighting fixtures exist, such as those disclosed in U.S. Pat. No. 6,152,581, that use a variety of light sources for internal illumination and use a variety of power sources for powering the light sources. Many emergency lighting fixtures share a housing of common design, and particularly a housing frame of common design, which is preferably molded either as a single, unitary element. The housing typically has at least certain structural elements that are useful in some if not all of the fixtures. The housing frame forms a basic element to which one or more facing plates that include exit message indicia can be coupled. The housing frames are preferably formed of a polymeric material such as ABS blended with polycarbonate. The same materials can be used for a continuous matrix portion of the facing plate while openings are provided in the continuous matrix defining the exit message.

To ensure that the exit message indicia are easily seen, a planar sheet or plate is mounted to the interior surface of the facing plate. The interior sheet or plate is made of a different plastic that is generally transparent or translucent and colored a suitable eye-catching color. The term "different plastics" is intended to cover plastics of differing composition as well as plastics of substantially the same composition having merely a difference in appearance. Back illumination of the facing plate creates a colored image showing through openings in the facing plate that are shaped in the form of the indicia. The sheet or plate of colored plastic is generally hand assembled to the facing plate inner surface prior to assembly of the facing plate to the housing frame. Increased use of moldable fastening elements has eliminated the need for separate fasteners such as screws or the like in the assembly and mounting of the fixtures. In particular, snap-fitting structural elements formed integrally with the facing plates provide easy snap-fitting of the colored plastic sheets or plates to the interior of the facing plates. Further snap-fitting structural elements formed integrally with either the facing plates or the housing frames allow coupling of the facing plates to the housing frames to form the primary structural housings of the fixtures. Other snap-fitting structural elements can be used for mounting of lamps, circuit-bearing platforms, wiring and the like. Assembly of such fixtures is facilitated at least in part due to a reduced number of parts occasioned by the integral nature of the housing frames. However, the illumination provided to the indicia through the colored plate is not always satisfactory, particularly with low-level light sources.

What is needed is an improvement in the delivery of illumination through the indicia defining openings in the facing plate. What is further needed is any possible reduction in cost and assembly time through the elimination of further hand assembly steps in the formation of the lighted emergency exit signage.

SUMMARY OF THE INVENTION

The forgoing needs can be satisfied by stepwise molding, using two different plastics, a facing plate for signage with appropriately colored portions defining a plurality of symbols surrounded by a continuous matrix. The continuous matrix portion can be first formed in a cavity between a first and second mold member. The first mold member has a first cavity defining surface including a first gate for admitting a first plastic, while the second mold member is movable with respect to the first mold member and has a second cavity defining surface confronting the first cavity defining surface. The cavity defining surfaces are spaced from each other by a predetermined distance to define the cavity for receiving the first plastic. A set of slides are provided in the second mold member that are movable between a projecting position wherein a contact surface of each of the slides is in contact with the first cavity defining surface and a retracted position wherein the contact surfaces are spaced from the first cavity defining surface. The set of slides have lateral surfaces defining a plurality of symbols representing the message to be conveyed by the signage. The retracted position of the set of slides is such that the lateral surfaces of the set of slides at least partly extend beyond the second cavity defining surface.

In a first embodiment, the first gate admits the first plastic only when the set of slides is in the projecting position so as to define the molded matrix portion of the facing plate. A set of second gates is provided with each second gate confronting a contact surface of one of the set of slides. The second gates admit a second plastic only when the set of slides are in the retracted position so that the molded matrix remains stabilized as the second plastic is admitted to form a plurality of symbols within the matrix. Each of the symbol forming portions of the second plastic are bonded to the surrounding matrix portion of the facing plate so that the resulting facing plate can be handled as a single unit during assembly with a suitable housing frame.

In a second embodiment, the first gate admitting the first plastic only when the set of slides is in the projecting position defines the plurality of symbols. The second gate confronting a contact surface of at least one of the set of slides admits the second plastic only when the set of slides are in the retracted position so that the plurality of symbols remain stabilized as the second plastic is admitted to form the matrix portion of the facing plate surrounding the plurality of symbols. In the second embodiment, the cavity defined between the first and second cavity defining surfaces can include a portion tying groups of the plurality of symbols together. Further, the cavity defined between the first and second cavity defining surfaces can include one or more surfaces defining a common light input surface for groups of the symbols leading to enhanced illumination even from low light sources.

In a third embodiment, the second mold member need not include the set of slides used in the first and second embodiments. The second mold member includes fixed lateral surfaces defining the plurality of symbols representing the message to be conveyed by the signage. A third mold member is provided that is movable in coordination with the second mold member to the closed position when the second mold member is not in the closed position. The third mold member has a third cavity defining surface confronting the first cavity defining surface when in the closed position from a position spaced sufficiently to define a cavity for receiving the second plastic. The second gate admits the second plastic only when the third mold is in the closed position. The third mold member generally includes a contact surface adapted to contact the first plastic held by the first mold member so that the molded matrix remains stabilized as the second plastic is admitted. In the third embodiment either the set of symbols or the continuous matrix can be formed first. Once the second plastic in introduced when the third mold is in the closed position, the molded article formed includes a plurality of symbols within the matrix, and can include a common light input surface for groups of the symbols leading to enhanced illumination even from low light sources.

In a fourth embodiment, the first and second mold members are movable to an open position for receiving either a matrix element or a symbol indicia element, which can include a plurality of indicia, previously molded of a first plastic in a separate mold. The second mold member has lateral surfaces for positioning the previously molded element at a prescribed position and has a second cavity defining surface adapted to confront the first cavity defining surface through spaces adjacent to the lateral surfaces of the previously molded element when located in a closed position. The second cavity defining surface is spaced from the first cavity defining surface by a predetermined distance to define a cavity for receiving a second plastic. The gate in the first mold member admits the second plastic only when the second mold is in the closed position. The second mold member including stabilizing elements to ensure that the previously molded element remains stabilized as the second plastic is admitted to form a plurality of symbols within a matrix. In any of the embodiments, the first and second mold members further include abutting surface portions for forming apertures in the molded matrix that remain unfilled by the second plastic.

The facing plates of the present invention are thus integrally formed to cooperate with the structural features of known housing frames. Formation of the present integrated facing plates from moldable materials further allows integral formation of fastening elements that eliminate the need for separate fasteners, such as screws or the like, in the assembly and mounting of the facing plates to the housing frames. In particular, snap-fitting structural elements can be formed integrally with the facing plates of the invention to provide not only easy snap-fitting of facing plates to the housing frames, but also rapid and simple mounting of lamping, circuit-bearing platforms, wiring and the like, if required. Assembly of the present fixtures is facilitated at least in part due to a reduced number of parts occasioned by the integral nature of the facing plates of the present invention. The overall cost is also reduced while the level of illumination delivered to the symbols forming the exit message indicia is enhanced. Other features and advantages of the present invention will become more readily apparent as the structure of the present fixture is described below in detail with reference to the accompanying drawings.

DESCRIPTION OF PREFERRED EMBODIMENTS

Figure 1:
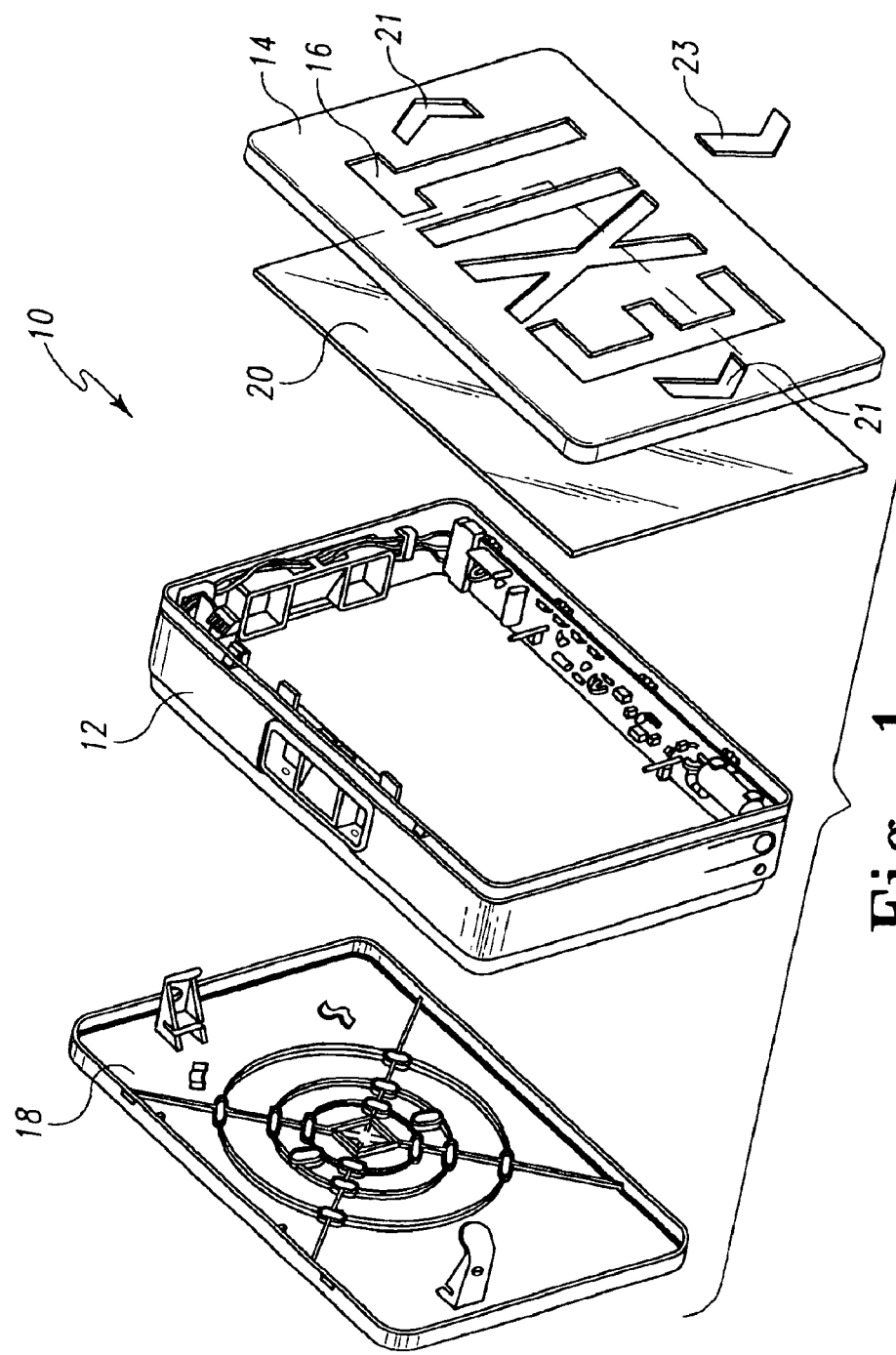
FIG. 1 is an exploded perspective view illustrating the primary components of a prior art emergency lighting fixture.

FIG. 1 shows a prior art illuminated exit sign 10 that includes a housing frame 12, a front cover plate 14 having indicia 16 formed therein, a rear mounting plate 18 and a colored, light-transmitting panel 20 mounted to the front cover plate 14 to provide background for the indicia 16. The housing frame 12 having the plates 14 and 18 mounted thereto essentially comprises the housing structure of the exit sign 10. It is to be understood that the rear mounting plate 18 can be removed and another plate essentially identical to the front cover plate 14 substituted to form a version of the exit sign 10 wherein the sign 10 is top mounted or side mounted to create an exit sign having indicia such as the indicia 16 on both major faces. In a direct wall-mounted installation, the rear mounting plate 18 is necessary in order for the sign 10 to be mounted directly to a wall. The front cover plate 14 is typically provided with chevron-shaped openings 21, which also have the colored, light-transmitting panel 20 as background. The openings 21 provide directional indication of the existence of an egress path. When one or both of the openings 21 are inappropriate to a particular location of the exit sign 10, a snap-fitting chevron plate 23 is inserted into one or both of the openings 21 to provide a light-tight fitting which eliminates said one or both of the openings 21 as a means for directional indication. The snap-fitting plates 23 can be rapidly and positively mounted into the openings 21 without the requirement for gaining access into the interior of the exit sign 10. Placement of one of the chevron-shaped plates 23 into one of the chevron-shaped openings 21 prevents light generated by illumination sources of various types placed interiorly of the exit sign 10 from passing through the opening 21 which is so covered. In certain installations wherein the exit sign 10 may be placed directly over a doorway or the like, it is possible that both of the openings 21 will be blocked out to prevent misinterpretation of an intended directional indication during emergency conditions. Certain other installations may require that both of the openings 21 must remain open to provide directional indications such as in an installation signaling that a path of egress exists to both sides of the sign 10.

Figure 2:
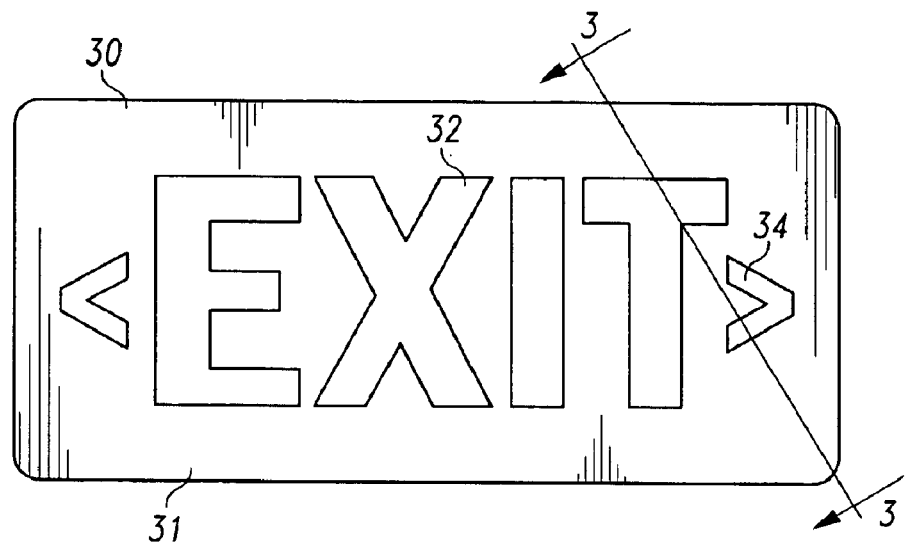
FIG. 2 is a front plan view of a facing plate including indicia produced by a mold of the present invention.

FIG. 2 is a front plan view of an integrated facing plate 30 including indicia 32 and chevron-shaped openings 34 produced by a mold of the present invention. The facing plate 30 includes a matrix portion 31 molded of a first, generally opaque, plastic while the indicia 32 are molded of a different plastic that is generally transparent or translucent and colored a suitable eye-catching color. The term "different plastics" is intended to cover plastics of differing composition as well as plastics of substantially the same composition having merely a difference in appearance. The integrated facing plate 30 is formed to cooperate with the structural features of known housing frames such as housing frame 12 of FIG. 1. Formation of the integrated facing plate 30 from moldable plastics further permits the elimination of the colored, light-transmitting panel 20 used in the prior art apparatus. The integrated facing plate 30 includes chevron-shaped openings 34 that are intended to receive chevron-shaped inserts much like the inserts 23 of the prior art, except that the inserts can be made of either the first or second plastic so that they can be opaque as was the prior art inserts, or light transmitting. The formation of the integrated facing plate 30 can be achieved through a number of molding processes, using any of a number of possible mold formations, which will be detailed in the following discussion.

Figure 3:
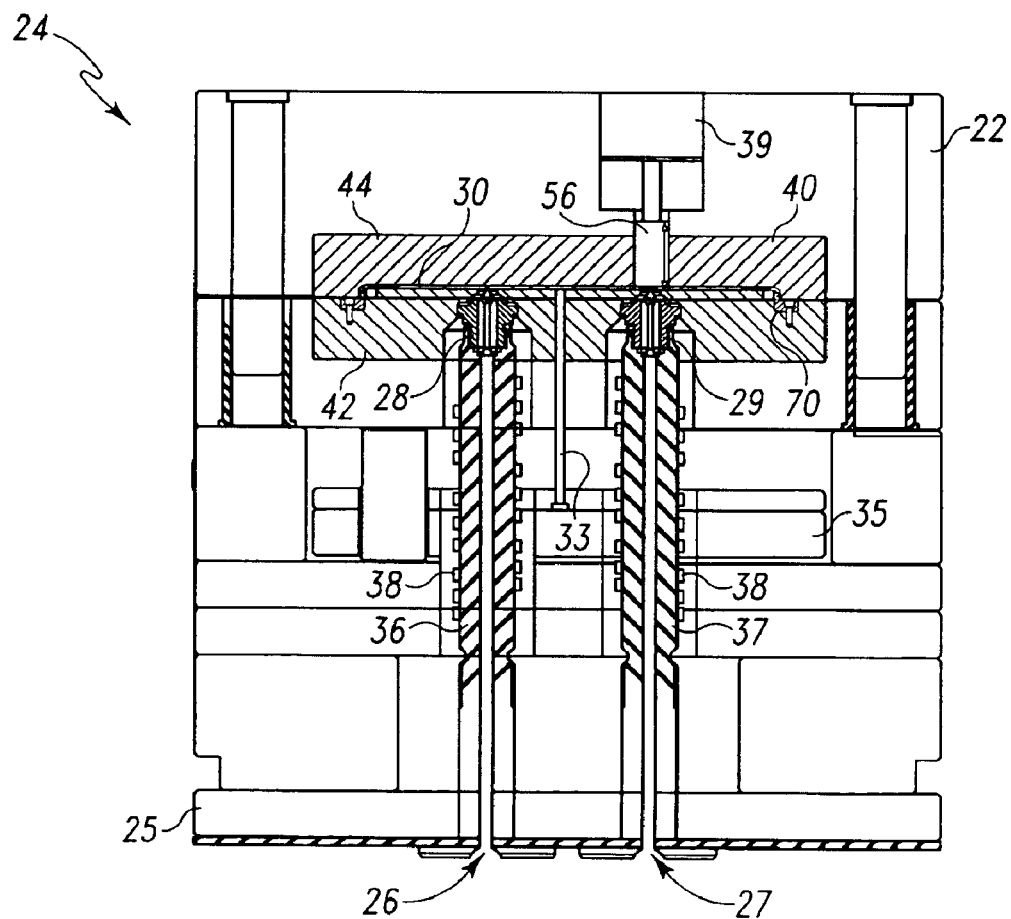
FIG. 3 is a sectional view of a molding apparatus for producing a facing plate including indicia according to the present invention.

FIG. 3 is a sectional view of a molding apparatus 24 including a mold 40 for molding an integrated facing plate 30. The molding apparatus 24 includes a stationary platen 25 adapted to be mounted at a fixed position in an injection molding machine having two plasticizers. A first injection nozzle opening 26 is provided in the stationary platen 25 to receive the nozzle of a first of the two plasticizers while a second injection nozzle opening 27 is provided in the stationary platen 25 to receive the nozzle of the second of the two plasticizers. The first and second openings 26 and 27 lead through manifolds 36 and 37 to a first gate 28 and second gate 29, respectively, that control the flow of molten plastics from the plasticizers into the mold 40 for forming the integrated facing plate 30. Heaters 38 surround each of the manifolds 36 and 37 and can be operated to control the temperature of the molten plastics as they are introduced into the mold 40.

The molding apparatus 24 also includes a movable platen 22 that is coupled to a movable portion of the injection molding machine so that the mold 40 can be reciprocally moved between the "closed position" illustrated in FIG. 3 and an "open position" allowing for ejection of the molded integrated facing plate 30 from the mold 40. An ejection pin 33 is coupled to an ejection plate 35, which is movable with respect to the fixed platen 25 to assist in the ejection of the molded integrated facing plate 30 from the mold 40. A movable core element or slide 56 is included in the mold 40, as described below. A motor element 39, such as a servo motor or hydraulic cylinder, is coupled to the core element or slide 56 to control the position of the slide with respect to the remaining portions of the mold 40.

Figure 4A:
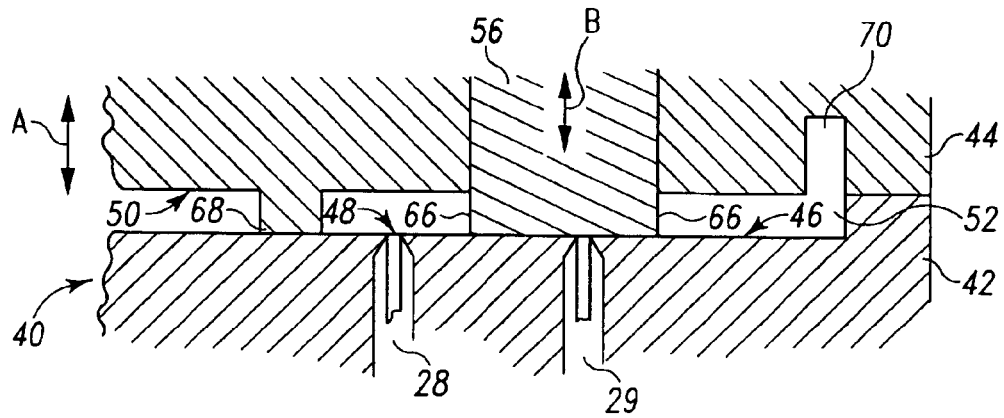
FIG. 4A is a sectional detail view of a mold, the section taken along line 3—3 of the facing plate segment shown in FIG. 2 within a molding apparatus of the present invention similar to that shown in FIG. 3 prior to injection of either plastic.

FIG. 4A is a sectional view of the mold 40 for molding the integrated facing plate 30. The sectional view can be considered as being taken through that portion of the molding apparatus that would produce the portion of the integrated facing plate 30 along line 3—3 of FIG. 2. The molding apparatus 40 includes a first mold member 42 and second mold member 44. The first mold member 42 has a first cavity defining surface 46 including the first gate 28 for admitting the first plastic. The second mold member 44 is movable with respect to the first mold member 42 in the direction of arrow A by the movable platen 22 shown in FIG. 3. The second mold member 44 has a second cavity defining surface 50 confronting the first cavity defining surface 46. The cavity defining surfaces 46 and 50 are spaced from each other by a predetermined distance to define a cavity 52 for receiving the first plastic 54, shown in FIG. 4B, that forms the matrix portion 31 of the integrated facing plate 30.

Figure 4B:
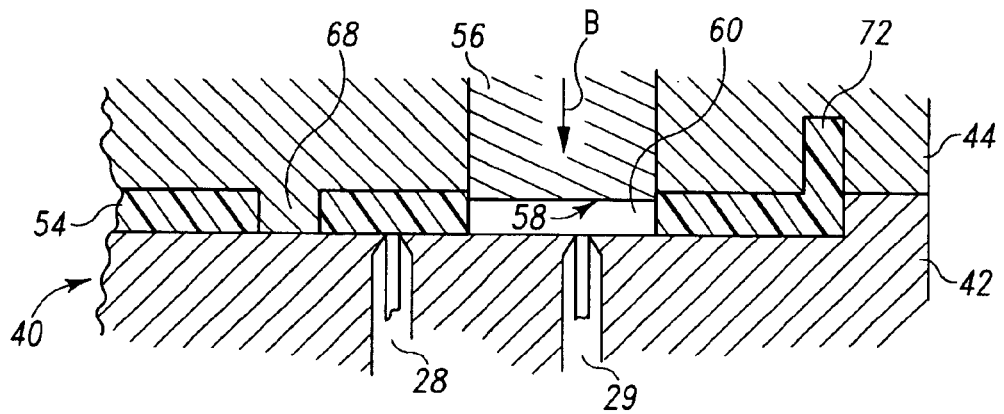
FIG. 4B is a sectional view identical to FIG. 3, but with the slide retracted to permit injection of a second plastic.

The slide 56 is provided in the second mold member 44 and is movable in the direction of arrow B between a projecting position, shown in FIG. 4A, and a retracted position, shown in FIG. 4B, by the motor element 39, shown in FIG. 3. When the slide 56 is in the projecting position, shown in FIG. 4A, a contact surface 58 of the slide 56 is in contact with the first cavity defining surface 46. When the slide 56 is in the retracted position, shown in FIG. 4B, the contact surface 58 is spaced from the first cavity defining surface 46 and defines a second cavity 60 for receiving, through the second gate 29, the second plastic 62, shown in FIG. 5, to form the indicia 32. It will be appreciated that while only a single slide 56 is shown in FIGS. 3, 4A and 4B, the several indicia 32 forming a word such as "EXIT" can be formed with one or more slides moved by one or more motor elements 39.

The slide 56 has lateral surfaces 66 defining one or more of the plurality of symbols representing the message to be conveyed by the facing plate 30. In the retracted position, the lateral surfaces 66 of the slides 56 are preferably positioned such that the lateral surfaces 66 extend at least partly beyond the second cavity defining surface 50 which inhibits movement of the previously molded matrix portion 31 formed by the first plastic 54 during injection of the second plastic 62. The second plastic 62 forms the plurality of symbols or indicia 32 within the matrix 31 with edge portions 64 of the second plastic 62 bonded to the surrounding matrix so that the resulting integrated facing plate 30, shown in FIG. 5, can be handled as a single unit during assembly with a suitable housing frame, such as frame 12 of the prior art shown in FIG. 1.

The second mold member 44 is shown in FIGS. 4A and 4B to include an abutting surface portion 68 that abuts the first cavity defining surface 46 of the first mold member 42 to form the chevron-shaped apertures 34 in the molded matrix 31. The second mold member 44 is also shown in FIGS. 4A and 4B to include a perimeter cavity portion 70 defining a casing 72 around the matrix portion 31 intended to cooperatively engage a suitable frame such as housing frame 12 of the prior art. The perimeter cavity portion 70 is shown in FIG. 3 to be included in the first mold member 42. Either the first or second mold members 42 or 44 can include indentations for forming coupling tabs, not illustrated, for coupling the matrix 31 to the housing frame. Both the first and second mold members 42 and 44 can also include cams coupled to the indentations forming undercut surfaces, not shown, in the coupling tabs.

Figure 6:
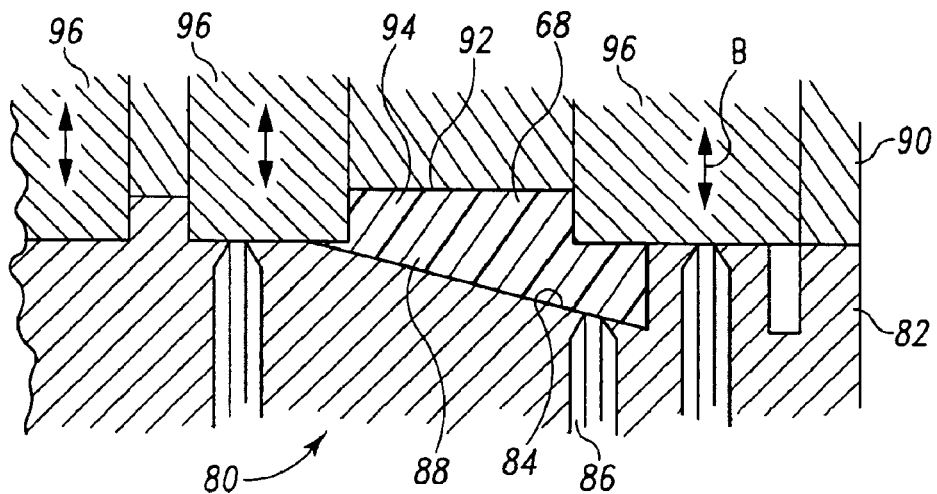
FIG. 6 is a sectional view similar to FIG. 3 of another mold of the present invention within a molding apparatus of the present invention similar to that shown in FIG. 3 after a first plastic has been injected, but before movement of the slides.
Figure 7:
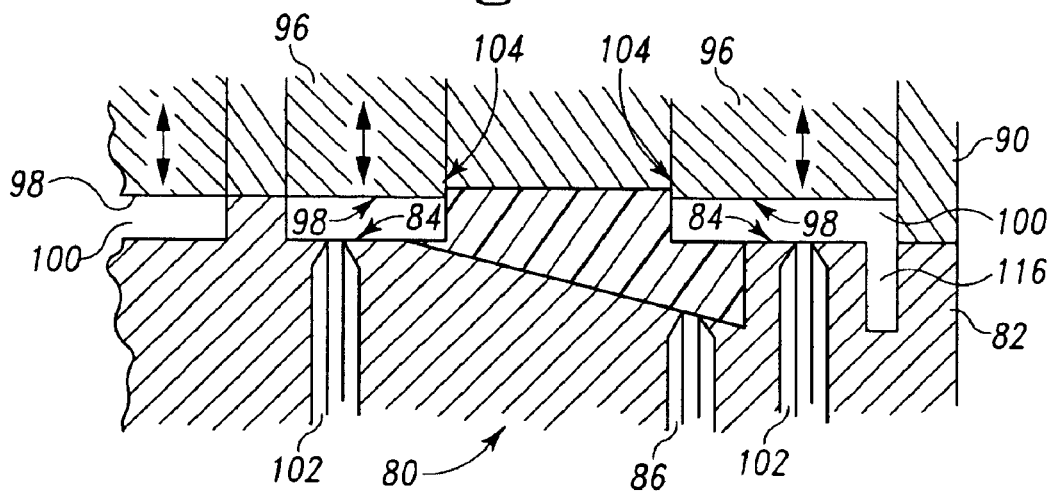
FIG. 7 is a sectional view identical to FIG. 6 after the slides have been moved to receive the second plastic.

FIGS. 6 and 7 are sectional views similar to FIGS. 4A and 4B of another mold 80 of the present invention. The mold 80 can be employed in the molding apparatus 24 as shown in FIG. 3. The mold 80 includes a first mold member 82 having a first cavity defining surface 84 including a first gate 86 for admitting a first plastic 88. The mold 80 also includes a second mold member 90, which is movable with respect to the first mold member 82 by a movable platen like platen 22 shown in FIG. 3. The second mold member 90 has a second cavity defining surface 92 confronting the first cavity defining surface 84. The cavity defining surfaces 84 and 92 are spaced from each other by a predetermined distance to define the cavity 94 for receiving the first plastic 88. The first plastic 88, which can be supplied through manifold 36 from the first injection nozzle opening 26 as shown in FIG. 3, forms indicia 68, which are similar in function but different in form from indicia 32 of the prior embodiment.

A set of slides 96 are provided in the second mold member 90 that are movable between a projecting position, shown in FIG. 6 and a retracted position shown in FIG. 7 by a motor element 39 as shown in FIG. 3. When in the projected position, a contact surface 98 of each of the slides 96 is in contact with the first cavity defining surface 84. When the slides 96 are moved to the retracted position, the contact surfaces 98 are spaced from the first cavity defining surface 84 to define a second cavity 100. Second gates 102 connect the second cavity 100 to a source of a second plastic 48 for forming the matrix 31 surrounding the indicia 68. The source for the second plastic 48 can be the manifold 37 and second injection nozzle opening 27 as shown in FIG. 3.

The first mold member 82 can include indentations, not illustrated, to be filled with the second plastic for forming coupling tabs to couple the matrix portion 31 to a housing frame of the prior art. The first mold member 82 can also include cams coupled to the indentations forming undercut surfaces, not shown, in the coupling tabs. The set of slides 96 have lateral surfaces 104 defining margins of the indicia 68. In the retracted position, the lateral surfaces 104 of the set of slides 96 extend at least partly beyond the second cavity defining surface 92 to stabilize the position of the indicia 68 during the introduction of the second plastic. This also ensures that a front surface 106 of the matrix 31 will be slightly recessed from the front surface 108 of the indicia 68 as can be seen in FIG. 8.

Figure 8:
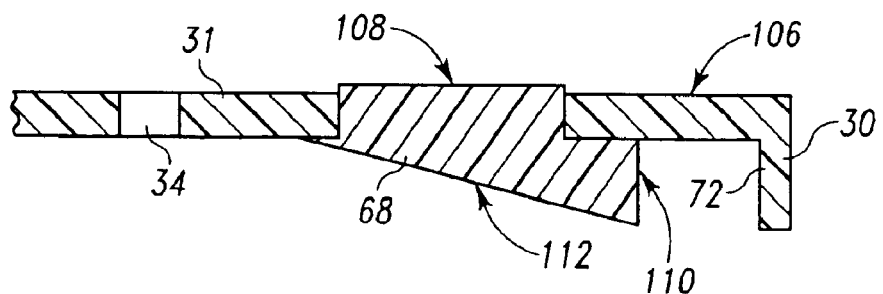
FIG. 8 is a sectional view of the facing plate molded with the mold of FIGS. 6 and 7.

It will be further noted from FIG. 8 that the indicia 68 includes a laterally facing surface 110 and a tapering surface 112, both which can have other configurations yet achieve a similar function. The laterally facing surface 110 is intended to confront a lower-powered lighting source such as might be used during emergency conditions. Light emitted from the lower-power lighting source enters the indicia 68 through laterally facing surface 110 and is internally reflected off tapering surface 112 toward and outward through the front surface 106 at a very high efficiency. The tapering surface 112 can also confront and admit light from a higher-powered lighting source such as might be used during non-emergency conditions.

The first mold member 82 also includes an abutting surface portion 114 that abuts the first cavity defining surface 92 of the second mold member 90 to form the chevron-shaped apertures 34 in the molded matrix 31. The first mold member 82 also includes a perimeter cavity portion 116 defining a casing 72 around the matrix portion 31 intended to cooperatively engage a suitable frame such as housing frame 12 of the prior art as shown in FIG. 1.

Figure 9:
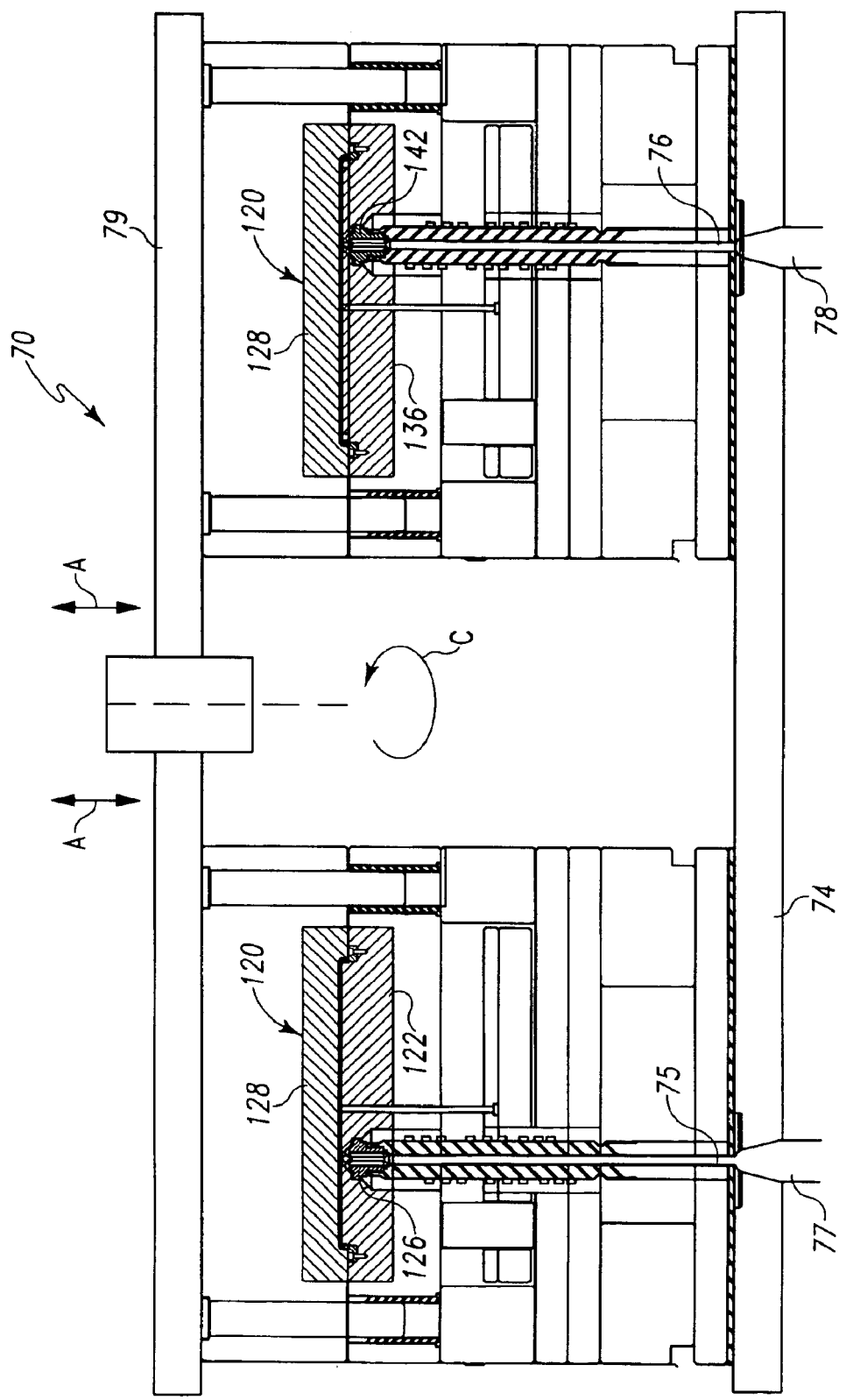
FIG. 9 is a section view of another molding apparatus for producing a facing plate including indicia according to the present invention.

FIG. 9 shows a sectional view of a second molding apparatus 70 that uses a lateral, rotational, oblique or other equivalent motion to move one molding member between two other molding members to generate an integrated facing plate 30 according to the present invention. The second molding apparatus includes a stationary platen 74 that includes first and second openings 75 and 76 that are intended to be coupled to the injection nozzles 77 and 78 of two plasticizers supplying two different plastics. Gates 126 and 142 control the flow of plastics through the openings 75 and 76, respectively. The second molding apparatus 70 also includes a movable platen 79, which reciprocally moves in the direction of arrows A between the illustrated closed position and an open position. When in the open position, the movable platen is adapted to be moved laterally, rotationally, obliquely, or in some other direction indicated by arrow C so that one molding member 128 moves between two other molding members 122 and 136, as described in greater detail below, to generate an integrated facing plate 30. The molding apparatus 70 includes a pair of ejection pins 71 and 73, similar in structure and operation to the ejection pin 33 shown in FIG. 3, that ensure the proper ejection of molded articles from both of the molding members 122 and 136.

Figure 10A:
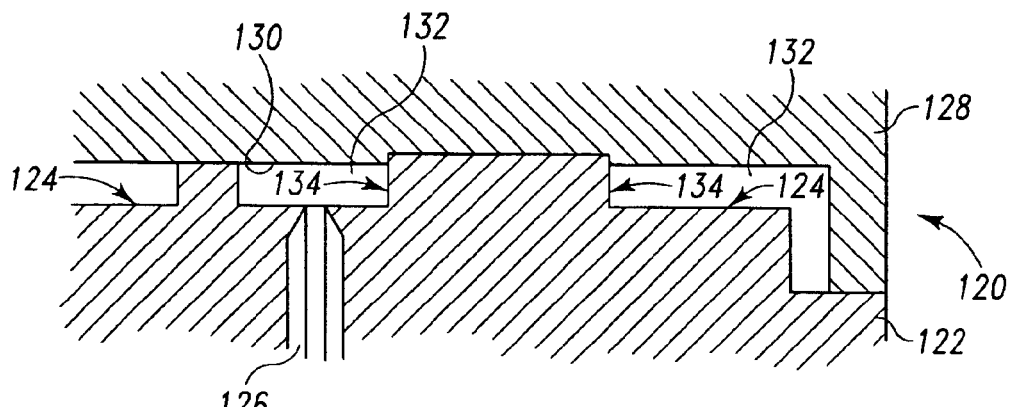
FIG. 10A is a sectional view similar to FIG. 3 of a mold for use in the apparatus of FIG. 9 before a first plastic has been injected.

FIG. 10A is a sectional view similar to FIG. 4A of the mold 120 of the present invention suitable for use in the molding apparatus 70 shown in FIG. 9. The mold 120 includes the first mold member 122 having a first cavity defining surface 124 including the first gate 126 for admitting the first plastic. The second mold member 128, which is movable with respect to the first mold member 122 by the movable platen 79, has a second cavity defining surface 130, which confronts the first cavity defining surface 124 when the first and second mold members 122 and 128 are closed against each other. With the first and second mold members 122 and 128 in a closed position confronting each other, the cavity defining surfaces 124 and 130 are spaced from each other by a predetermined distance to define an initial cavity 132 for receiving the first plastic. In the illustrated embodiment the cavity 132 defines the matrix portion 31 of the integrated facing plate 30, but the initial cavity 132 can instead be configured to define the indicia 68 as described in conjunction with FIGS. 6–8.

Figure 10B:
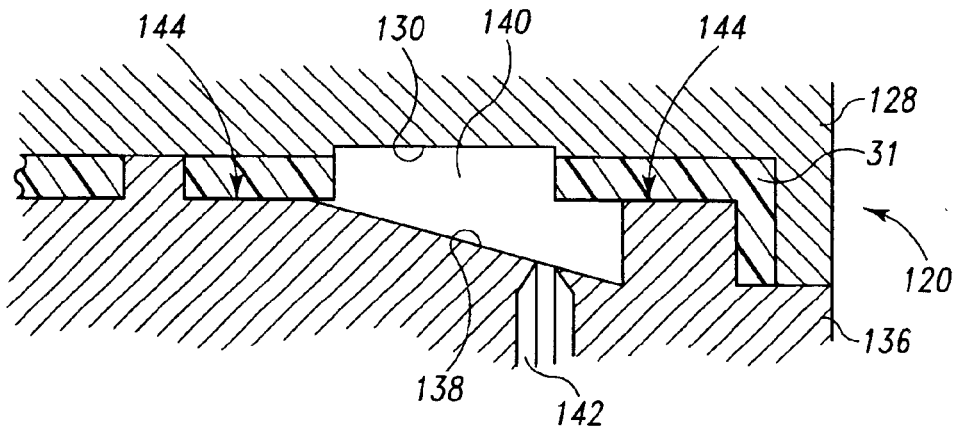
FIG. 10B is a sectional view similar to FIG. 9 after the second mold member has been moved into position to receive the second plastic injection in the apparatus of FIG. 9.

The first mold member 122 includes fixed lateral surfaces 134 defining the indicia 68 forming a plurality of symbols representing the message to be conveyed by the facing plate 30. In the molding apparatus 70, a third mold member 136 is provided, shown in FIG. 10, that is positioned adjacent to the first mold member 122 so that the second mold member 128 and be moved by the moving platen 79 to confront either mold member 122 or 136. It will be appreciated by those skilled in the art that the same effect can be achieved by having the mold members 122 and 136 be movable in relation to a pair of similarly positioned second mold members 128, the differences being merely one of frame of reference, and somewhat more difficult execution.

The third mold member 136 has a third cavity defining surface 138 confronting the second cavity defining surface 130 when in the closed position from a position spaced sufficiently to define a cavity 140 for receiving the second plastic. The third mold member 136 includes a second gate 142 that admits the second plastic only when the third mold member 136 is in the closed position confronting the second mold member 128. The third mold member 136 generally includes a contact surface 144 adapted to contact the first plastic held by the second mold member 128 so that the first molded portion remains stabilized as the second plastic is admitted. In this third embodiment, either the set of symbols 32 or 68, or the continuous matrix 31 can be formed first.

Figure 5:
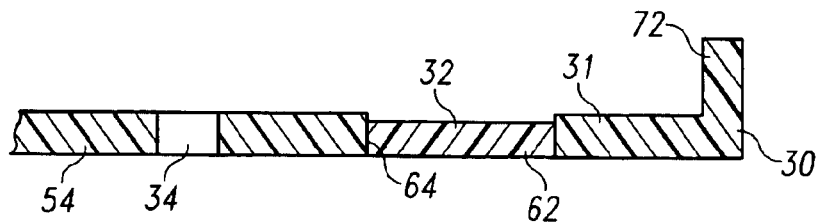
FIG. 5 is a sectional view of the facing plate molded with the mold of FIGS. 4A and 4B.

Once the second plastic in introduced when the third mold is in the closed position, the molded article formed includes a plurality of symbols or indicia within the matrix 31 that can have the appearance of the integrated facing plate 30 of FIG. 2 and either FIG. 5 or 8, or yet some other variation. The integrated facing plate 30 formed with the apparatus 120 can include a common light input surface, such as surfaces 110 and 112, for groups of the symbols leading to enhanced illumination even from low light sources. After injection and cooling of the second plastic, the integrally formed facing plate 30 is ejected from between the second and third mold portions 128 and 136, and the first and second mold portions 122 and 128 are returned to a closed position with respect to each other, and the cycle is repeated.

Figure 11:
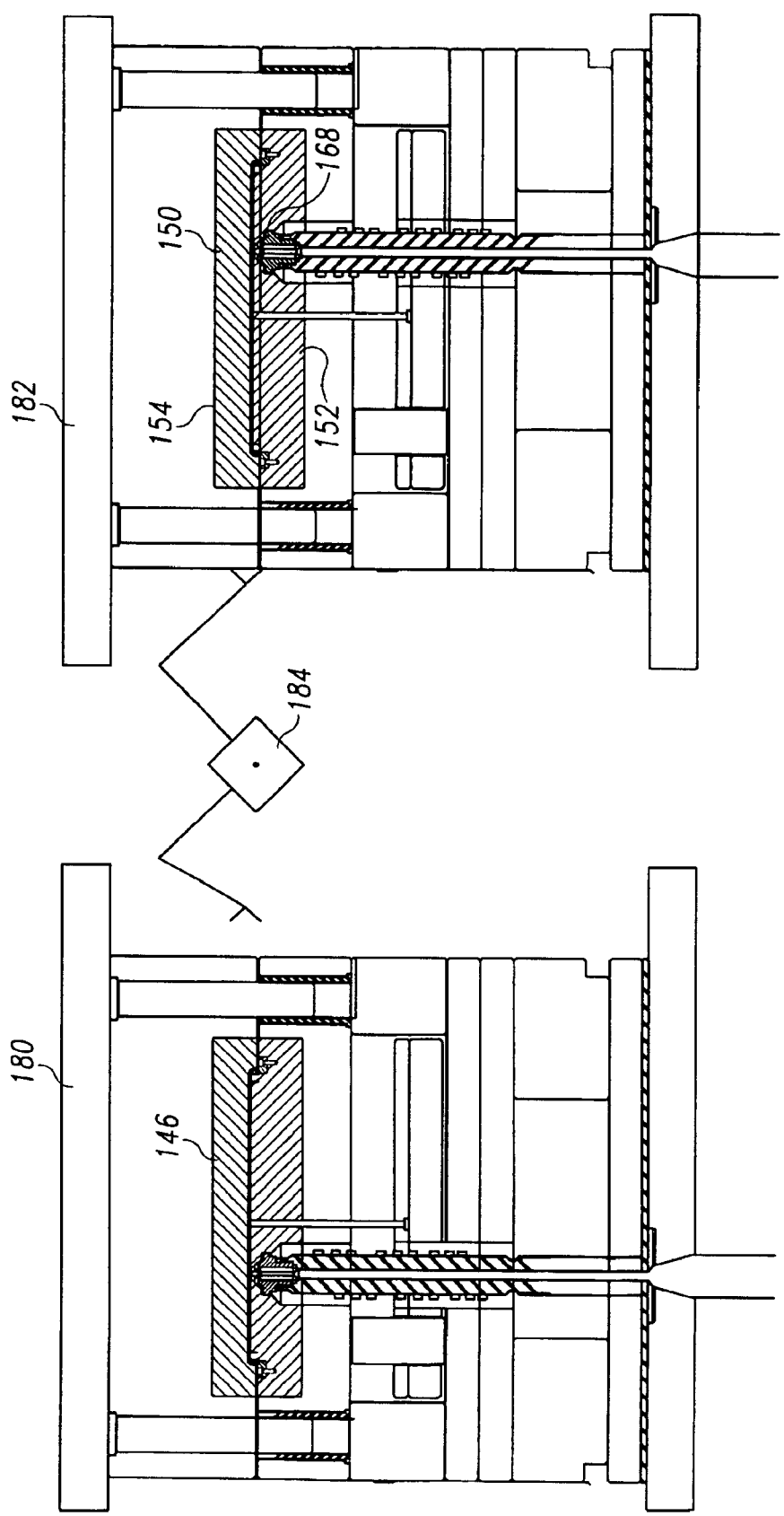
FIG. 11 is a section view of yet another molding apparatus for producing a facing plate including indicia according to the present invention.

In yet another molding operation according to the present invention, the apparatus shown in FIG. 11 is employed to form an integral facing plate 30. The operation shown in FIG. 11 employs two separate injection molding machines 180 and 182 that are situated adjacent to each other and preferably operated in a coordinated cycle with a transfer mechanism 184. The injection molding machine 180 containing mold 146 is used to form with a first plastic a first portion 158 of the integral facing plate, which can be either the matrix 31 or an attached set of indicia 32. Once the first portion 158 of the integral facing plate is formed in mold 146, the transfer mechanism 184 transfers the first molded portion from the first molding machine 180 to the open mold 150 in the second molding machine 182.

Figure 12:
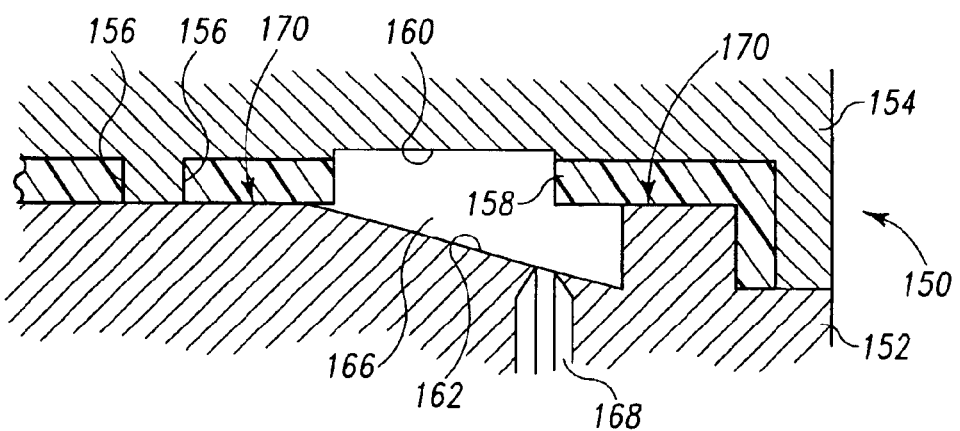
FIG. 12 is a sectional view similar to FIG. 3 of a mold for use in the apparatus of FIG. 11 after a first molded plastic insert has been inserted into the molding apparatus in preparation for a second injection.

The second mold 150 is shown in greater detail in FIG. 12 to include first and second mold members 152 and 154, which are movable to an open position for receiving the previously molded first element 158 having the form of matrix element 31 or one or more symbol indicia elements 33. The second mold member 154 can have lateral surfaces 156 for positioning the previously molded element 158 at a prescribed position within the second mold 150. The second mold member 154 also has a second cavity defining surface 160 adapted to confront a first cavity defining surface 162 of the first mold member 152 through spaces 164 adjacent to the lateral surfaces 156 of the previously molded element 158 when the mold 150 is in a closed position. The second cavity defining surface 160 is spaced from the first cavity defining surface 162 by a predetermined distance to define a cavity 166 for receiving a second plastic. A gate 168 in the first mold member 152 admits the second plastic only when the second mold member 154 is in the closed position. The first mold member 152 includes stabilizing elements 170 in the form of compression surfaces to ensure that the first molded element 158 remains stabilized as the second plastic is admitted to form a second molded portion of the unitary facing plate 30. The completed unitary facing plate 30 is then removed from mold 150 and a next first element 158 is placed in the open mold 150 in a continuation of the molding cycle.

The facing plates 30 of the present invention are thus integrally formed to cooperate with the structural features of known housing frames. Formation of the present integrated facing plates 30 from moldable materials further allows integral formation of fastening elements that eliminate the need for separate fasteners, such as screws or the like, in the assembly and mounting of the facing plates 30 to the housing frames 14. Assembly of the present fixtures is facilitated at least in part due to a reduced number of parts occasioned by the integral nature of the facing plates 30 of the present invention. The overall cost is also reduced while the level of illumination delivered to the symbols forming the exit message indicia is enhanced.

While particular embodiments of the invention have been described above in relation to the illustrations for only a few preferred configurations of the invention shown in the drawings, it should be understood that the invention can be embodied other than as shown herein and even further embodied other than is particularly described herein. The invention can also be used in the construction of emergency lighting fixtures other than the particular illuminated signs described and shown above. Accordingly, the scope of the invention is defined by the recitations of the appended claims and the equivalents thereof.

What is claimed is:

1. An integrated signage facing plate comprising:
   a matrix portion molded of a first generally opaque plastic and having a front surface and a back surface, the matrix portion including at least one opening defining a message, and at least one cavity extending between the front and back surfaces of the matrix portion, each cavity including a edge feature for mechanically receiving an insert,
   an insert molded of a generally transparent plastic and mechanically coupled by a snap-fitting connection to the edge feature of one of the cavities to allow light transmission therethrough,
   an indicia portion molded within the at least one opening of a second plastic that is generally transparent or translucent, the indicia portion being thereby bonded to the surrounding matrix portion of the facing plate so that the matrix and indicia portions can be handled as a single unit during subsequent assembly, and
   coupling structure integrally molded as part of the matrix portion to cooperate with a known structural feature of a known housing frame for coupling the matrix portion and included indicia to the housing frame in a single assembly step.

2. An integrated signage facing plate of claim 1 further comprising an insert molded of generally opaque platic and mechanically coupled to the edge feature of one of the cavities to block any light transmission therethrough.

3. An integrated signage facing plate of claim 1 formed by the process of:
   injecting one of the first and second plastics into a first cavity in a mold defined by first and second mold members,
   moving one of the first and second mold members with respect to the other to define a second cavity, and
   injecting another of the first and second plastics into the second cavity at a temperature and pressure sufficient to bond any confronting surfaces of the first and second plastics to each other.

4. An integrated signage facing plate comprising:
   a matrix portion molded of a first generally opaque plastic and having a front surface and a back surface, the matrix portion including at least one opening defining a message, and at least one cavity extending between the front and back surfaces of the matrix portion, each cavity including a edge feature for mechanically receiving an insert,
   an indica portion molded within the at least one opening of a second plastic that is generally transparent or translucent, the indicia portion being thereby bonded to the surrounding matrix portion of the facing plate so that the matrix and indica portions can be handled as a single unit during subsequent assembly,
   an insert molded of a generally opaque plastic and mechanically coupled to the edge feature of one of the cavities to block any light transmission therethrough, and another insert molded of a generally transparent plastic and mechanically coupled to the edge feature of one of the cavities to allow light transmission therethrough, and
   coupling structure integrally molded as part of the matrix portion to cooperate with a known structural feature of a known housing frame in a single assembly step.

* * * * *

UNITED STATES PATENT AND TRADEMARK OFFICE
CERTIFICATE OF CORRECTION

PATENT NO. : 7,047,679 B2 Page 1 of 1
APPLICATION NO. : 10/281943
DATED : May 23, 2006
INVENTOR(S) : J. Larry Underwood et al.

It is certified that error appears in the above-identified patent and that said Letters Patent is hereby corrected as shown below:

The following prior art patent numbers were omitted:

6,029,382 A    02/2000    Kochanowski, George E.
6,253,477 B1   07/2001    Balint, Gregory J.

Column 10,
Line 65, after the word "frame" add "for coupling the matrix portion and included indicia to the housing frame"

Signed and Sealed this

Fifth Day of September, 2006

JON W. DUDAS
*Director of the United States Patent and Trademark Office*